United States Patent [19]

Wallace et al.

[11] 4,039,399

[45] Aug. 2, 1977

[54] METHOD OF MAKING A BEARING SURFACE

[75] Inventors: William Patrick Wallace, Hagerstown; Anthony George Angilella, Richmond, both of Ind.

[73] Assignee: Dana Corporation, Toledo, Ohio

[21] Appl. No.: 364,983

[22] Filed: May 29, 1973

Related U.S. Application Data

[62] Division of Ser. No. 123,316, March 11, 1971, Pat. No. 3,770,286.

[51] Int. Cl.$^2$ .............................................. C25D 7/04
[52] U.S. Cl. ...................................... 204/25; 204/23; 204/35 R; 204/41; 204/129.1
[58] Field of Search .................. 204/41, 23, 25, 35 R, 204/129.1; 277/235 A

[56] References Cited

U.S. PATENT DOCUMENTS

| | | | |
|---|---|---|---|
| 2,856,334 | 10/1958 | Topelian | 204/41 |
| 2,873,154 | 2/1959 | Marker | 277/235 A |
| 3,157,585 | 11/1964 | Durham | 204/41 |
| 3,188,186 | 6/1965 | Durham | 204/41 |
| 3,408,272 | 10/1968 | Such et al. | 204/41 |
| 3,418,220 | 12/1968 | Roggendorf | 204/41 |
| 3,421,986 | 1/1969 | Ruff et al. | 204/41 |
| 3,461,048 | 8/1969 | Mahlstedt et al. | 204/41 |

FOREIGN PATENT DOCUMENTS

| | | | |
|---|---|---|---|
| 462,725 | 1/1950 | Canada | 204/23 |
| 632,377 | 12/1961 | Canada | 204/41 |
| 568,161 | 3/1945 | United Kingdom | 204/41 |
| 503,903 | 4/1939 | United Kingdom | 204/41 |

*Primary Examiner*—O. R. Vertiz
*Assistant Examiner*—Wayne A. Langel
*Attorney, Agent, or Firm*—Robert E. Pollock

[57] ABSTRACT

Disclosed herein is a method of making an improved bearing surface wherein a first layer of hard chromium is electrodeposited on a metallic substrate, a second layer of microcracked chromium is deposited on the first layer and the second layer of microcracked chromium is etched to provide a finely porous, friable bearing surface.

7 Claims, 5 Drawing Figures

METHOD OF MAKING A BEARING SURFACE

CROSS REFERENCE TO RELATED APPLICATIONS

This is a division of application Ser. No. 123,316, filed Mar. 11, 1971, now U.S. Pat. No. 3,770,286.

BACKGROUND OF THE INVENTION

This invention relates generally to a method of forming an improved bearing surface and more particularly to a method of forming the bearing surface of a sealing member, such as a piston ring.

A requirement of the bearing surface of a dynamic sealing member, such as a piston, is that it mate perfectly with the surface against which it seals. In addition, the bearing surface of a dynamic sealing member must be wear resistant and able to withstand high temperatures.

Hard chromium plate has been found to be satisfactory as the bearing surface of a dynamic sealing member, but its application has several inherent disadvantages. For economic reasons it is necessary to electrodeposit the hard chromium at relatively high deposition rates which results in large nodules and a coarse grain structure. To prevent scoring and scuffing (i.e., localized welding) between the sealing member and the surface being sealed, it is necessary to lap the bearing surface to wear down the protruding nodules formed during plating and to remove other surface irregularities that result from plating over an imperfect substrate. The required lapping operations are necessarily expensive.

A second disadvantage of hard chromium plate as the bearing surface must of a sealing member results from the fact that the bearing surface initially wear until it is in perfect conformity with the surface to be sealed. The wear resistant property of hard chromium plate thus become a disadvantage in that it extends the period required to reach this conformity (i.e., the break-in period) and hence, extends the period during which the sealing member performs at less than designed efficiency.

These disadvantages are well-known and numerous attempts have been made to overcome them. The proposed solutions have generally centered around overplating the hard chromium with a softer, less wear resistant metallic material. These solutions have their own disadvantages in that the softer material wears away too rapidly or sloughs off. Also, because of its softness it is subject to localized welding with the surface being sealed. Etching of the hard chromium has also been proposed to make it less wear resistant. This has been unsuccessful because it re-exposes the coarse nodules that were originally removed by lapping and which cause scratching and scuffing.

SUMMARY OF THE INVENTION

The invention disclosed herein provides a method of forming an improved bearing surface for a dynamic sealing member, such as a piston ring, and includes the steps of electrodepositing a first layer of hard chromium on the bearing surface of a sealing member, electrodepositing a substantially thinner second layer of microcracked chromium on the first layer and electrochemically etching the surface of the second layer to provide a finely porous and friable surface that has the desirable properties of hard chromium, including its hardness, but not its undesirable property of wear resistance. Etching the fine microcracked structure produces a surface that is friable and less wear resistant than ordinary hard chromium plate which permits the bearing surface of the sealing member to wear-in, i.e., assume conformity with the surface against which it seals, in a far shorter time than is ordinarily the case with hard chromium plate. Because of the surface of the second layer is finely porous, it is also oil wetable. Thus, the bearing surface is better lubricated, particularly during the initial wear-in period, which increases initial scuff resistance.

Other objects and advantages of the invention will become apparent from the following detailed description and drawings in which.

In its preferred embodiment, the method of this invention is practiced to form the bearing surface of a piston ring which functions as a dynamic sealing member to seal between the piston and cylinder wall of an internal combustion engine. It will be obvious from the following description that the method of this invention may be practiced to form other bearing surfaces having similar operating requirements.

Figure 1:
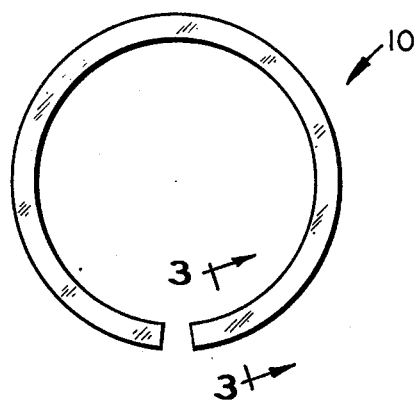
FIG. 1 is a plan view of a piston ring.
Figure 2:
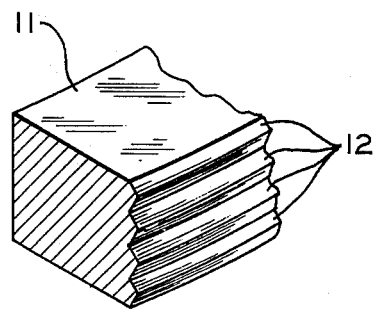
FIG. 2 is a partial perspective view showing a section of the piston ring blank prior to plating.

Referring to the drawings, a piston ring 10 is formed of a conventional metallic piston ring blank 11, which is a split annular member or ring. Any conventional piston ring material can be used including cast irons, steels and stainless steels. As shown particularly in FIG. 2, a series of axially spaced, annular grooves 12 are tool formed in the circumference or outer peripheral or bearing surface of the piston ring blank 11. The grooves 12 are shallow having a depth of about 0.003 inch and an included angle of 120°. Tool forming grooves on the bearing surface of a ring is conventional practice and can be omitted if desired. The bearing surface of the piston ring blank can be given any other conventional form, such as barrel face.

In commencing the plating operation, a number of rings are assembled in concentric relationship on a plating arbor and closed so as to expose only their respective bearing surfaces to the plating bath. A first layer 13 of hard chromium is electrodeposited on the outer peripheral surface of the assembled rings.

The first layer 13 of hard chromium can be applied by using conventional plating baths and procedures. Two examples of plating bath compositions (aqueous solutions) and operating parameters are the following:

| | |
|---|---|
| Chromic Acid | 17.2 – 74.5 oz./gal. |
| Sulfate | 0.26 – 0.58 oz./gal. |
| Bath Temperature | 90° – 140° F. |
| Current Density | 3.0 – 5.0 a.s.i. |
| | and |
| Chromic Acid | 12 – 64 oz./gal. |
| Sulfate | 0.10 – 0.40 oz./gal. |
| Active Fluoride* | 0.50 – 2.65 oz./gal. |
| Bath Temperature | 90° – 140° F. |
| Current Density | 3.0 – 5.0 a.s.i. |

(*The active fluoride described herein functions as a catalyst and may be omitted.)

The plating is continued for a sufficient length of time to obtain the desired thickness of the first layer which ranges from 0.0025–0.0060 inch. The hardness of the first layer will be in excess of 775 measured on the Vicker's scale (VPN$_{100}$). The crack density of the first layer is typically in the range of 1200–2200 cracks per inch.

After the first layer of hard chromium has been applied, the rings are transferred to a second plating bath, without rinsing, where they are allowed to soak before electrodepositing the second layer 14 of microcracked chromium plate.

Microcracked chromium plate is characterized by the presence of a large number of fine, intersecting, randomly arranged cracks with a crack density of at least 5000 cracks per inch. The crack pattern is distinct and readily distinguishable from conventional chromium plate which has typically coarse or gross cracks with a crack density of less than 3000 cracks per inch. Crack density is measured by counting the number of cracks which cut across a definite gage length (inch or centimeter).

The second layer 14 of microcracked chromium plate can be applied by several processes. The preferred method of applying the second layer is by electrodepositing it from an aqueous bath of the following composition and using the following operating parameters:

| Chromic Acid | 18.8 – 73.6 oz./gal. |
|---|---|
| Sulfate | 0.10 – 0.52 oz./gal. |
| Active Fluoride | 0.10 – 0.52 oz./gal. |
| Selenium* | 0.0003 – 0.0040 oz./gal. |
| Bath Temperature | 90° – 140° F. |
| Current Density | 0.5 – 2.3 a.s.i. |

(*The selenium described herein is preferably in the form of sodium selenate.)

The plating current is gradually and slowly increased to the desired level, and maintained a sufficient length of time to obtain the desired thickness of the second layer 14 which ranges from 0.0002 to 0.0010 inch. The hardness of the second layer is in excess of 775 measured on the Vicker's scale (VPN$_{100}$). The crack density of the second layer is in excess of 5000 cracks per inch.

Within the ranges set forth above the preferred bath composition and operating parameters are as follows:

| Chromic Acid | 20.0 – 55.0 oz./gal. |
|---|---|
| Sulfate | 0.11 – 0.20 oz./gal. |
| Active Fluoride | 0.20 – 0.40 oz./gal. |
| Selenium | .00065 – .0020 oz./gal. |
| Bath Temperature | 100° – 130° F. |
| Current Density | 1.0 – 2.0 a.s.i. |

The crack density of a second layer electrodeposited in accordance with the above typically ranges from 6200 to 7100 cracks per inch or an average of 6650 cracks per inch.

An alternative method of electrodepositing the first and second layers of hard conventional chromium and microcracked chromium respectively is to use a single aqueous plating bath of the following composition:

| Chromic Acid | 17.2 – 74.5 oz./gal. |
|---|---|
| Sulfate | 0.26 – 0.60 oz./gal. |
| Active Fluoride | 0.10 – 0.54 oz./gal. |
| Selenium | .0003 – .0040 oz./gal. |
| Bath Temperature | 90° – 140° F. |

In this method, the first layer of hard chromium plate is deposited at a curent density 3.0–5.0 a.s.i. (amperes per square inch) until a uniform thickness of 0.0025–0.0060 inch is obtained. Then the current density is reduced to the range of 0.5–2.3 a.s.i. and the second layer of microcracked chromium is plated until a uniform thickness of 0.0002–0.0010 inch is obtained. Each of the layers deposited by the above described method has a hardness in excess of 775 measured on the Vicker's scale (VPN$_{100}$). The crack density of the second layer is in excess of 5000 cracks per inch. The crack density of the first layer is higher than in the first described method and will approach, but is less than, 3000 cracks per inch.

Within the ranges for single bath method, the preferred bath composition and operating parameters are as follows:

| Chromic Acid | 30.0 – 50.0 oz./gal. |
|---|---|
| Sulfate | 0.30 – 0.55 oz./gal. |
| Active Fluoride | 0.2 – 0.4 oz./gal. |
| Selenium | .00065 – .0020 oz./gal. |
| Bath Temperature | 100° – 130° F. | and a current density range of 1.0–2.0 a.s.i. for applying the second layer. Current density for applying the first layer is maintained in the range of 3.0–5.0 a.s.i.

After the first and second layers have been applied (by either of the above described methods), the outer surface of the second layer is etched. Etching may be accomplished either chemically or electrochemically. The preferred method is electrochemical etching. The plated rings after being rinsed are placed in an aqueous solution of chromic acid (25–45 ounces per gallon) at a temperature of 90°–130° F. At this particular bath temperature the reverse plating current density is 0.5–3.0 a.s.i. The reverse current is applied only sufficiently long to remove material at the interfaces (i.e. along the microcracks) without substantially affecting the thickness of the second layer. Because of the fine grain structure and microcrack pattern of the second layer, the etched surface of the second layer is finely porous and friable.

Unlapped rings plated in accordance with the above described method have been subjected to engine testing and to comparison testing with lapped rings plated only with hard chromium. Unlapped rings plated in accordance with the above method which show clear light (i.e. by pass light when placed in an engine cylinder) before engine testing establish light tightness in less than one hour and continuous contact with the cylinder wall within the first 2½ hours of engine operation.

Further, comparison engine testing with lapped rings plated with hard chromium has shown that rings formed in accordance with this invention wear at selective high points, without scratching the cylinder or scuffing, and conform faster to the cylinder wall. Such engine tests indicate that the piston rings of this invention, after the initial "wear-in", wear at a rate equivalent to conventional hard chromium plated rings.

Figure 3:
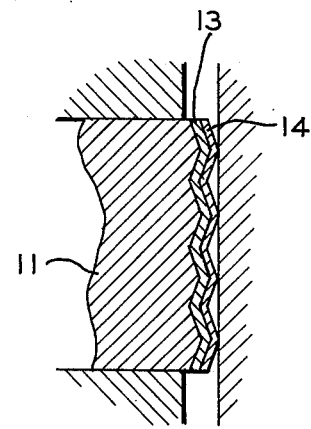
FIG. 3 is a sectional view of the plated piston ring; taken along the line 3—3 of FIG. 1, showing the piston ring within the groove of a piston and against a cylinder wall.
Figure 4:
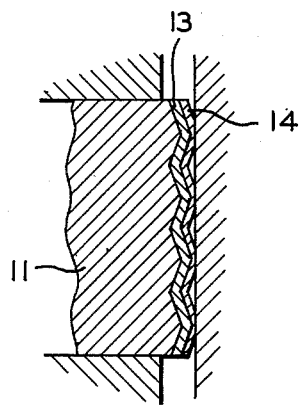
FIGS. 4 and 5 are views similar to FIG. 3 showing still further wear of the bearing surface of the piston ring.
Figure 5:
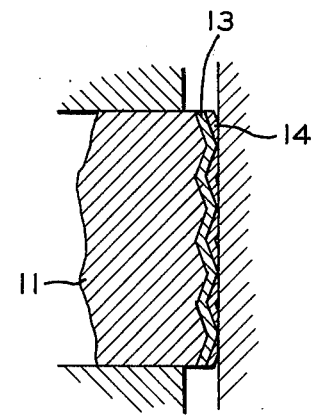

As is illustrated in FIGS. 3–5, initial contact between the ring and the cylinder wall is only with the microcracked or second layer 14 which functions to cover up irregularities in the surface of the first layer 13 and provides a surface that is substantially as hard, but faster wearing than conventional hard chromium plate. As break-in of the ring occurs, the first layer wears away selectively at the high points until at points the hard chromium first layer becomes exposed. At this point, as shown in FIG. 5, the rings continue to wear at the normal rate.

It has been found that the finely porous surface of the second layer is oil wetable or retains a film of oil. This is a desirable condition for start-up conditions in that it provides initial scuff resistance. Also, it has been unexpectedly found that whereas hard chromium plate cracks under load due to its extreme brittleness and lack of ductility, it has been found that the microcracked chromium plate shows no evidence of further cracking under load. It is believed that in hard chromium plate there is a physical contraction of the coating during plating, whereas in plating microcracked chromium similar contraction does not occur. As a result microcracked chromium has more ability to expand and contract upon heating and greater ability to adjust to strain, such as elastically by mass movement of the individual microcrack particles.

Having described my invention, I claim:

1. A method of forming a bearing surface which comprises the steps of: (a) electrodepositing on a metallic substrate a first layer of chromium having a Vicker's hardness in excess of 775; (b) electrodepositing a second layer of microcracked chromium having a Vicker's hardness in excess of 775 on said first layer; and (c) etching the outer surface of said second layer to provide said surface finely porous and friable.

2. The method of forming a bearing surface which comprises the steps of: (a) electrodepositing a first layer of chromium on a metallic substrate, said first layer having a crack density of less than 3000 cracks per inch and a Vicker's hardness in excess of 775, (b) electrodepositing a second layer of chromium on said first layer, said second layer being thinner than said first layer and having a crack density of more than 5000 cracks per inch and a Vicker's hardness in excess of 775, and (c) etching the surface of said second layer to remove material along said cracks without substantially reducing the thickness of said second layer.

3. The method of claim 2 wherein said first and second layers are electrodeposited from a single plating bath containing selenium.

4. The method of claim 2, wherein said etching step comprises electrochemical etching.

5. A method of making a piston ring which comprises the steps of: (a) electrodepositing a first layer of chromium having a Vicker's hardness in excess of 775 on the periphery of a metallic ring; (b) electrodepositing a second layer of microcracked chromium having a Vicker's hardness in excess of 775 on said first layer; and (c) electrochemically etching said second layer to provide a finely porous and slightly friable outer surface.

6. The method of claim 5, wherein the step of electrodepositing said second layer includes depositing the chromium of said second layer from a bath containing selenium.

7. A method of making a piston ring which comprises the steps of: (a) electrodepositing a first layer of chromium plate having a Vicker's hardness in excess of 775 to a thickness in excess of 0.0025 inch on the circumference of a metallic ring; (b) electrodepositing on said first layer a second layer of chromium at a slow deposit rate to provide a finely grained and microcracked structure and a Vicker's hardness in excess of 775; (c) rinsing said second layer; and (d) electrochemically etching said second layer to provide a finely porous and friable outer surface on said second layer.

* * * * *